US012664203B2

(12) United States Patent
Neystadt et al.

(10) Patent No.: US 12,664,203 B2
(45) Date of Patent: Jun. 23, 2026

(54) METHOD FOR CLASSIFYING DATA ITEMS

(71) Applicant: Varonis Systems, Inc., Miami, FL (US)

(72) Inventors: John Eugene Neystadt, Kfar-Saba (IL); Amit Cohen, Kfar-Saba (IL); Ron Sneh, Atlit (IL); Nir Zinger, Moshav Burgata (IL); Amit Osi, Tel Aviv-Jaffa (IL)

(73) Assignee: VARONIS SYSTEMS, INC., Miami, FL (US)

( * ) Notice: Subject to any disclaimer, the term of this patent is extended or adjusted under 35 U.S.C. 154(b) by 0 days.

(21) Appl. No.: 18/616,874

(22) Filed: Mar. 26, 2024

(65) Prior Publication Data

US 2025/0307301 A1 Oct. 2, 2025

(51) Int. Cl.
G06F 16/355 (2025.01)
G06F 16/334 (2025.01)

(52) U.S. Cl.
CPC ........ G06F 16/355 (2019.01); G06F 16/3347 (2019.01)

(58) Field of Classification Search
CPC ........................... G06F 16/355; G06F 16/3347
See application file for complete search history.

(56) References Cited

U.S. PATENT DOCUMENTS

| | | | |
|---|---|---|---|
| 12,284,193 B2 * | 4/2025 | Devaraj ............... | H04L 63/1416 |
| 12,299,134 B1 * | 5/2025 | Li ........................... | G06N 5/022 |
| 2006/0120526 A1 | 6/2006 | Boucher et al. | |

| | | | |
|---|---|---|---|
| 2006/0190988 A1 | 8/2006 | Adams et al. | |
| 2009/0292930 A1 | 11/2009 | Marano et al. | |
| 2012/0030187 A1 | 2/2012 | Marano et al. | |
| 2017/0048275 A1 | 2/2017 | John et al. | |
| 2017/0060993 A1 * | 3/2017 | Pendar ................... | G06F 16/334 |
| 2018/0225471 A1 | 8/2018 | Goyal et al. | |
| 2020/0279105 A1 | 9/2020 | Muffat et al. | |
| 2020/0327445 A1 | 10/2020 | Yu et al. | |
| 2021/0281592 A1 * | 9/2021 | Givental ................ | G06N 20/10 |
| 2022/0075961 A1 * | 3/2022 | Cavallari ............... | G06N 20/00 |
| 2022/0292222 A1 * | 9/2022 | Tikhomirov ........ | G06F 21/6263 |
| 2022/0294854 A1 * | 9/2022 | Tikhomirov ........... | H04L 67/34 |
| 2022/0398449 A1 * | 12/2022 | Khanna ................... | G06N 5/01 |
| 2023/0325814 A1 * | 10/2023 | Vijayan .............. | G06Q 20/3829 705/66 |
| 2025/0238342 A1 * | 7/2025 | Evans ................. | G06F 11/3476 |
| 2025/0307385 A1 * | 10/2025 | Charboneau, Jr. ..... | G06N 20/00 |

FOREIGN PATENT DOCUMENTS

| | | |
|---|---|---|
| CN | 103824031 A | 5/2014 |
| KR | 20100105161 A | 9/2010 |

\* cited by examiner

*Primary Examiner* — Tarek Chbouki
(74) *Attorney, Agent, or Firm* — COATS & BENNETT, PLLC

(57) ABSTRACT

Broadly speaking, the present techniques provide an automatic way of classifying data items within an environment (e.g. a business, workplace, organisation, etc.), and applying data management policies based on the classifications. This is advantageous over existing techniques which require manual classification of data items, which is time consuming in environments where hundreds of new data items may be generated in a day or week. The present techniques use an embedding machine learning, ML, model to automatically determine the relevant classification label(s) for an unlabelled data item, which is then used to select and apply the relevant data management policy(ies).

16 Claims, 5 Drawing Sheets

Determining data management policy

100

102

106    104

108

Determining data management policy

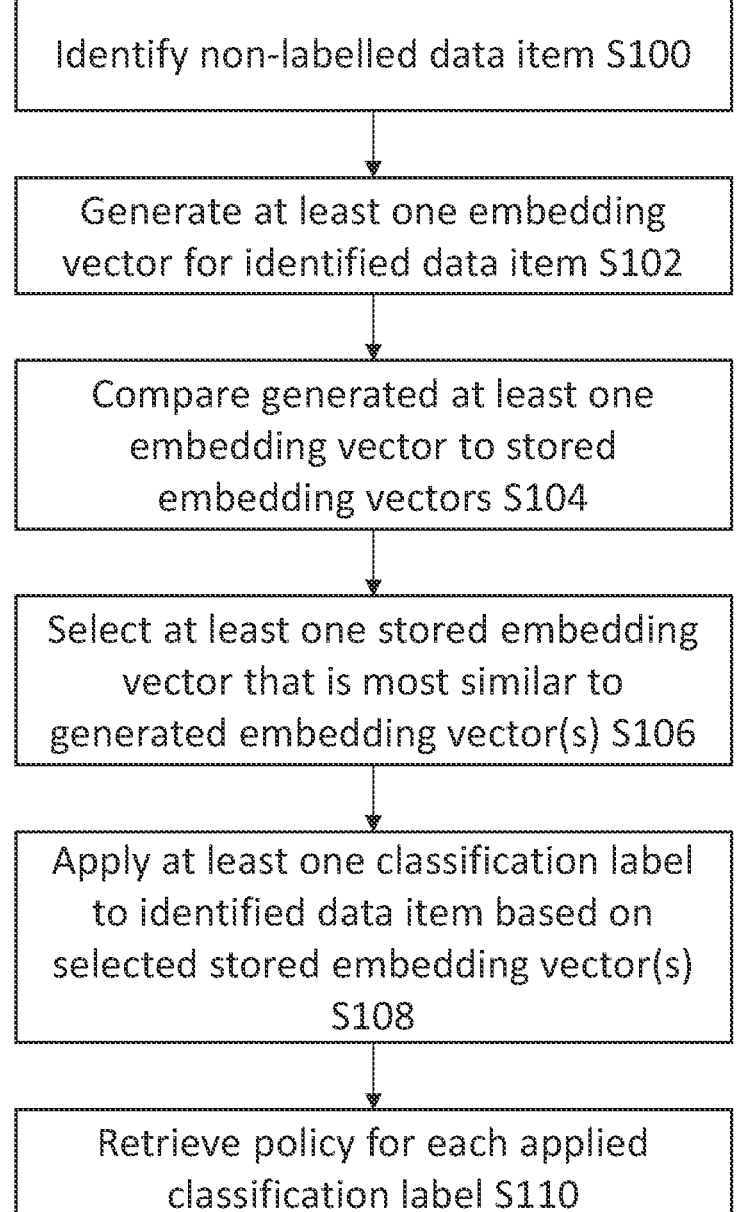

Identify non-labelled data item S100

Generate at least one embedding vector for identified data item S102

Compare generated at least one embedding vector to stored embedding vectors S104

Select at least one stored embedding vector that is most similar to generated embedding vector(s) S106

Apply at least one classification label to identified data item based on selected stored embedding vector(s) S108

Retrieve policy for each applied classification label S110

FIG. 2

Creating classification database

Controlling actions performed with respect to data items

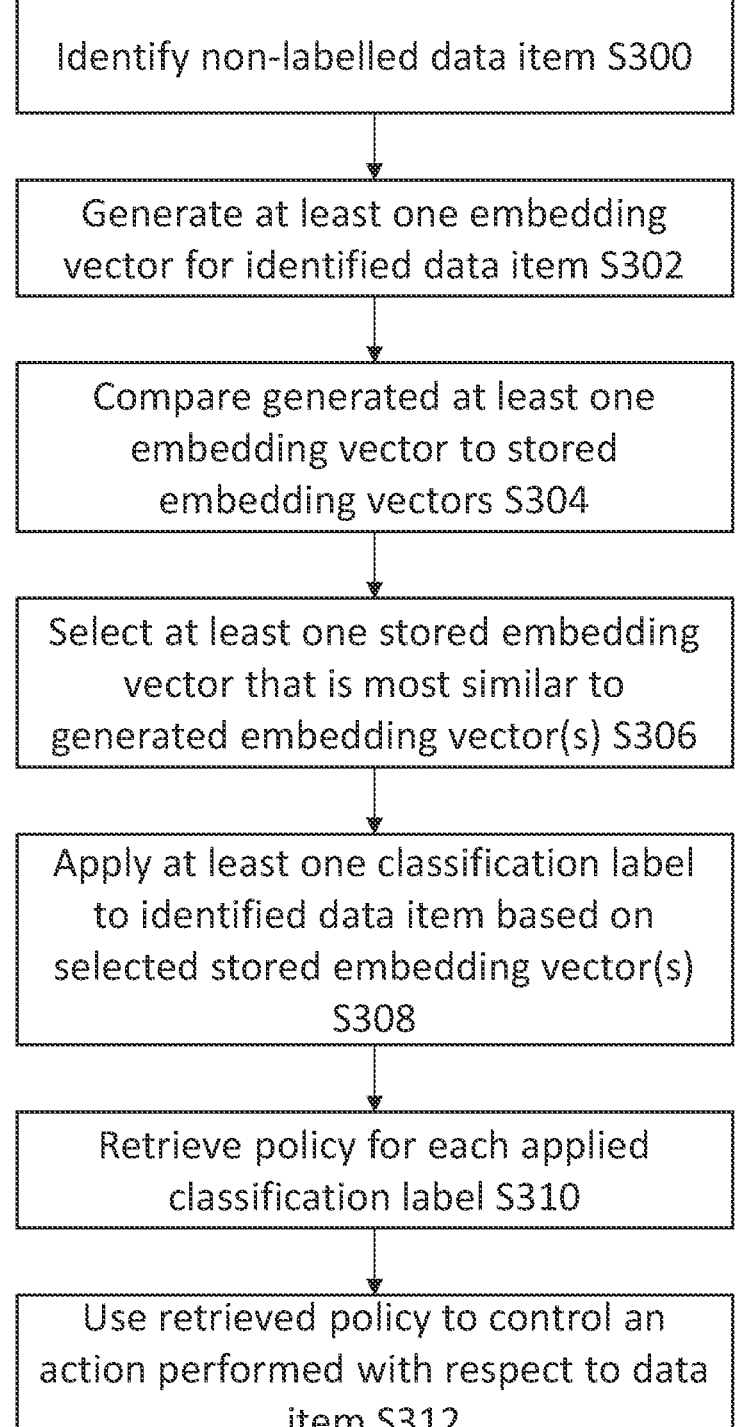

Identify non-labelled data item S300

Generate at least one embedding vector for identified data item S302

Compare generated at least one embedding vector to stored embedding vectors S304

Select at least one stored embedding vector that is most similar to generated embedding vector(s) S306

Apply at least one classification label to identified data item based on selected stored embedding vector(s) S308

Retrieve policy for each applied classification label S310

Use retrieved policy to control an action performed with respect to data item S312

FIG. 4

Generating topics from sample data items

METHOD FOR CLASSIFYING DATA ITEMS

FIELD

The present application generally relates to a method for classifying data items. In particular, the present application provides an automatic way of classifying data items and applying security policies based on the classifications.

BACKGROUND

Many organisations have policies which control actions that can be performed using or with respect to data items within the organisations. For example, organisations may have a policy to retain all emails sent and received by a person within the organisation for five years, after which they can be deleted. Similarly, organisations may have a policy that prevents certain data items from being transmitted outside of the organisation, or which controls who can access the data items within the organisation, or which controls how long data items should be retained before they can be deleted/purged. With huge volumes of digital data items being generated within organisations on a yearly and even daily basis, it is desirable to automate the application of such policies to the data items. However, this may require understanding the data items in some way, so that the appropriate policy/policies can be applied. For example, it may be useful to classify the data items. Currently, classification rules that help to determine how data items are classified may be manually generated, which is difficult and time consuming.

The present applicant has therefore recognised the need for an improved way to automatically apply security and data retention policies to data items within an organisation or environment.

SUMMARY

In a first approach of the present techniques, there is provided a computer-implemented method for determining a data management policy for a data item, the method comprising: identifying a non-labelled data item within an environment having at least one security policy; generating, using an embedding machine learning, ML, model, at least one embedding vector for the non-labelled data item, where the at least one embedding vector represents content of the non-labelled data item; comparing the generated at least one embedding vector to a database of stored embedding vectors that correspond to classification labels for data items; selecting, responsive to the comparing, at least one stored embedding vector that is most similar to the generated at least one embedding vector; applying, to the non-labelled data item, at least one classification label corresponding to the selected at least one stored embedding vector, and thereby generating a labelled data item; and retrieving at least one data management policy corresponding to the at least one classification label of the labelled data item.

Advantageously, the present techniques provide a way to automatically classify an unlabelled data item within an environment (e.g. a business, workplace, organisation, department within an organisation, etc.), and retrieve a relevant data management policy for the data item. This is advantageous over existing techniques that require manual classification of data items, which is time consuming in environments where hundreds of new data items may be generated in a day or week. As noted above, the present techniques make use of an embedding machine learning model to automatically determine the relevant classification label(s) for an unlabelled data item, which is then used to select and apply the relevant data management policy(ies). The data management policy may be any security and/or data retention policy. For example the data management policy may be a policy that prevents certain data items from being transmitted outside of the organisation, or that controls who can access the data items within the organisation, or that controls how long data items should be retained before they can be deleted/purged, or moved from primary storage to secondary or tertiary storage. The data management policy may be used to implement national or regional regulation or law, such as the European Union's General Data Protection Regulation (GDPR), or the USA's Data Privacy Protection laws.

The present techniques are also advantageous over existing techniques that automatically classify unlabelled data items using rules and regular expression matching, because relevant rules and regular expressions are difficult to create for specific environments and can suffer from false positives. The present techniques do not classify unlabelled data items by applying rigid classification rules or by pattern/expression matching. Instead the present techniques use embeddings to determine the meaning of content of the data item to thereby determine the most appropriate classification label. This is useful because even if a data item contains a certain phrase which might suggest that a certain classification label is relevant, the overall meaning of the content of the data item may indicate that a different classification label is more relevant. For example, an email may contain one phrase that relates to finance (suggesting the email should be classified with a "finance" label), but the overall meaning of the whole email may be about an employee's performance, so the email should be classified with a "human resources" label. Standard rules-based on expression matching techniques are unable to pick-up on this important difference between phrases and overall semantic meaning.

An embedding is a representation of values or objects, like text, images or audio, that can be understood and processed by machine learning models. An embedding usually takes the form of a vector, and thus the terms "embedding" and "embedding vector" are used interchangeably herein. An embedding is therefore a mathematical representation of a data item (e.g. text, image, video, audio, etc.), and may represent some or all of the content of the data item. For example, an embedding may represent the semantic meaning of a data item. Embeddings make it possible for machine learning models to understand the relationships between different data items. Embeddings are normally analysed within embedding space, i.e. a mathematical space in which similar items are positioned closer to one another than less similar items. For example, if embedding A for data item A is close to embedding B for data item B in embedding space, then data item A and data item B are similar in some way. For example, data item A may be a personnel file for an employee within an organisation, while data item B may be a job application from a candidate for a job within the organisation. Since both data items contain personal information about people, they may both be considered similar. In contrast, embeddings A and B may be far away from embedding C for data item C. Data item C may be a finance report created by a finance team within the organisation. Data item C contains different information to data items A and B, so it is considered to be dissimilar.

Advantageously, by using an embedding model to generate at least one embedding vector for non-labelled data items, non-labelled data items are automatically processed and classified. The present techniques make use of a database of stored embedding vectors which are representative of classification labels that an organisation wants to use to classify non-labelled data items. For example, the labels may be "personal", "finance", "human resources", "confidential business information", etc. By comparing (in embedding space) the embedding vectors generated for non-labelled data items with the stored labels, it is possible to quickly classify non-labelled data items. Furthermore, as each label is associated with at least one data management policy that is appropriate for that class, once the non-labelled data items have been determined, the appropriate security policy or policies can be quickly retrieved and used. This allows data management policies to be applied to new data items immediately rather than periodically when done manually, which improves data security and confidentiality.

The non-labelled data item may be any one of: an email, a document, a file, a text file, a folder, an image, a video, an audio file, a diagram, a geographical map, a medical image, a medical data file, a portable document format file, and any other specialised file type. It will be understood that this is a non-exhaustive and non-limiting list of example data item types.

The method may further comprise: prior to the generating, dividing the non-labelled data item into two or more segments; and generating the at least one embedding vector for each of the two or more segments. That is, in cases where the data item is large, a single embedding vector generated for the data item may not be very representative of all the content and semantic meaning within the data item. Thus, it may be useful to divide the data item into smaller chunks or segments, such that the generated embedding vectors capture the semantic meaning of the segments. For example, an image may be divided into image patches or segments, a video may be divided into segments containing one or more frames, and an audio file may be divided into smaller audio segments. The segments may be overlapping. It will be understood that any suitable way of dividing the data item may be used. In one case, each embedding vector generated for a segment is then compared to the database of stored embedding vectors, and the selecting, applying, generating and retrieving steps may be performed for each segment. In this way, multiple labels may end-up being applied to the data item. Alternatively, the embedding vectors generated for the segments are averaged in some way to create a single average embedding vector for the whole data item. The average embedding vector is then compared to the database of stored embedding vectors. The selecting, applying, generating and retrieving steps may be performed for the average embedding vector.

In some cases, the step of generating at least one embedding vector may comprise: extracting text content from the non-labelled data item; and generating at least one embedding vector for the extracted text content. Thus, the embedding vector(s) may be generated based on textual information within the data item. If the non-labelled data item is, for example, an image or video, text may be extracted from the image or frames of the video. Additionally or alternatively, for videos or audio files, a transcript of any speech contained within the video/audio file may be extracted.

In cases where text content is extracted from the non-labelled data item, the method may further comprise: prior to the generating, translating the extracted text into a pre-defined natural language. A natural language is any language used by humans, as opposed to, for example, computer programming languages. The pre-defined natural language may be a human language that is selected or determined in advance, and may be linked to the language used to train the embedding model. The translation may be required because the embedding model may have been trained using data items in one or more specific natural languages, such as English. The embedding model may not be able to process text in other languages, and therefore, the translation enables the embedding model to generate embedding vectors for data items that may contain other natural languages. Any suitable technique may be used to perform the translation. For example, the translation may be performed using machine translation techniques, which may utilise a large language model or other natural language processing mechanism.

The method may further comprise: prior to the generating, dividing the extracted text content into two or more segments; and generating the at least one embedding vector for each of the two or more segments. That is, in cases where the extracted text is long, a single embedding vector generated for the extracted text may not be very representative of all the content and semantic meaning within the text. There are two main reasons to divide the extracted text into chunks. One is that the context window of many embedding models is limited. For example, for OpenAI, the context window is 8 k tokens (i.e. words), and for some open-source models, it can be as low as 512 tokens (words). So, it is necessary to reduce the amount of text that is fed into the embedding model to generate the embedding vector. Another reason is that reducing the number of tokens (words) and limiting those tokens to be within the same page or paragraph, improves the accuracy of the semantic extraction. This is because the semantic meaning is better determined for shorter text segments. To avoid a loss of context, the division may comprise dividing the text content into overlapping segments, to avoid loss of context between segments. Thus, it may be useful to divide the extracted text into smaller chunks or segments, such that the generated embedding vectors capture the semantic meaning of the segments. The extracted text may be divided into pages, paragraphs, or into segments of a certain number of words. It will be understood that any suitable way of dividing the text may be used. Dividing the extracted text content into segments is also known as "chunking".

In some cases, generating at least one embedding vector comprises: generating text content for the non-labelled data item; and generating at least one embedding vector for the generated text content. This may be useful for non-labelled data items that do not contain any text that can be extracted. The generated text content may be a description or summary of the non-text content of the non-labelled data item. For example, if the non-labelled data item is an image (e.g. photograph, frame of a video, medical image, graph, schematic diagram, flowchart, diagram, etc.), the generated text content may summarise the meaning and content of the image. A large language model may be used to generate the text content, for example.

Additionally or alternatively, for non-labelled data items that do not contain any text that can be extracted, the at least one embedding vector may be generated for the non-text content of the data item. That is, the embedding model may be a multi-modal embedding model able to process multiple types of input data, and generate an embedding vector representing some or all of the content of the data item. For example, the embedding model may be able to generate an embedding vector representing features of an image or audio file. Alternatively, different single-modality embedding models may be used to process different types of input data. For example, one embedding model may be used to process text, another to process images or video frames, another to process audio, and so on. With respect to images, an image embedding model may be used. Image embedding models may receive an image, extract features from that image, and generate an embedding vector to represent the extracted features. Non-limiting examples of image embedding models include VisualBERT and vit-base-beans. With respect to images, images may not be divided into segments, but instead, if the image is too large to be processed by the embedding model, the image may be downscaled before being input into the embedding model. Any suitable downscaling technique may be used.

Comparing the generated at least one embedding vector to a database of stored embedding vectors may comprise: calculating a cosine similarity between the generated at least one embedding vector and each stored embedding vector. Cosine similarity is a measure of the similarity between two vectors, and is calculated by determining the cosine of the angle $\theta$ between the two vectors. When $\theta$ is close to 0°, cosine $\theta$ is close to 1, which means the vectors are similar; when $\theta$ is close to 90°, cosine $\theta$ is close to 0, which means the vectors are orthogonal; and when $\theta$ is close to 180°, cosine $\theta$ is close to $-1$ which means the vectors are opposite.

Selecting at least one stored embedding vector that is most similar to the generated at least one embedding vector may comprise: selecting at least one stored embedding vector that is within a predefined threshold distance in embedding space from the generated at least one embedding vector. For example, the cosine similarity may be used to determine which stored embedding vector is most similar to each embedding vector. Additionally or alternatively, each stored embedding vector within a predefined threshold distance (e.g. having a cosine $\theta$ value in a certain range), may be considered similar to the generated embedding vector.

In some cases, applying, to the non-labelled data item, the classification label corresponding to the selected at least one stored embedding vector may comprise: applying a single classification label to the non-labelled data item. That is, each non-labelled data item is labelled within a single classification label that is most representative of the data item or information contained within the data item.

Alternatively, applying, to the non-labelled data item, the classification label corresponding to the selected at least one stored embedding vector may comprise: applying multiple classification labels to the non-labelled data item when multiple stored embedding vectors are selected. In such cases, multiple classification labels may be necessary to fully represent the data item or information contained within the data item. This may occur in cases where the extracted text has been divided into segments and each segment results in a different classification label being applied. Alternatively, this may occur when the data item corresponds to multiple labels. For example, the data item may be an email, and "email" may be a label, but the content of the email may be confidential, and "confidential" may be a label. In this case, it is appropriate to apply two labels to the data item.

In cases where a labelled data item has multiple labels, retrieving at least one security policy for the labelled data item may comprise: retrieving a security policy corresponding to each label of the multiple classification labels applied to the non-labelled data item; and determining which security policy or policies to apply to the labelled data item. Continuing with the above example, for a data item that is labelled with "email" and "confidential", two data management policies may be retrieved-one for "email", and one for "confidential". The "email" security policy may relate to data retention, i.e. how long the email needs to be retained within the environment. The "confidential" policy may dictate who within the environment is able to access, read and/or edit the data item, and who is prevented from doing so. In this case, both policies may be applied to the data item without any conflict. However, in cases where the data management policies conflict or contradict with each other, it may be necessary to determine which data management policy to use, or how to use all of the retrieved policies. In some cases, the strictest data management policy of the retrieved policies may be applied.

In a second approach of the present techniques, there is provided a system for determining a data management policy for a data item, the system comprising: a database for storing embedding vectors that correspond to classification labels for data items; a classification engine for identifying a non-labelled data item within an environment having at least one data management policy; and an embedding machine learning, ML, model, for generating at least one embedding vector for the non-labelled data item, where the at least one embedding vector represents content of the non-labelled data item; wherein the classification engine is configured for: comparing the generated at least one embedding vector to a database of stored embedding vectors that correspond to classification labels for data items; selecting, responsive to the comparing, at least one stored embedding vector that is most similar to the generated at least one embedding vector; applying, to the non-labelled data item, at least one classification label corresponding to the selected at least one stored embedding vector, and thereby generating a labelled data item; and retrieving at least one data management policy corresponding to the at least one classification label of the labelled data item.

The features described above with respect to the first approach apply equally to the second approach and therefore, for the sake of conciseness, are not repeated.

In a third approach of the present techniques, there is provided a computer-implemented method for creating a classification database for determining a data management policy for a data item, the method comprising: obtaining: a plurality of classification labels to be used when labelling data items; and a plurality of sample data items representative of the plurality of classification labels; generating, using an embedding machine learning, ML, model, at least one embedding vector for each sample data item, where the at least one embedding vector captures characteristics of content of the sample data item; associating the at least one embedding vector for each sample data item with one of the plurality of classification labels; and storing, in a database, the generated at least one embedding vector and associated classification label for each sample data item.

As noted above, the first and second approaches require the use of a classification database. The third approach relates to how this classification database is generated so that it can be used to determine, automatically, a data management policy for new unlabelled data items within an environment. Advantageously, the classification database may be generated for a specific environment (e.g. workplace or organisation), so that the database is relevant to the types of data items within that environment and the types of labels and data management policies that need to be used within that environment.

Each sample data item may be any one or more of: an email, a document, a file, a text file, a folder, an image, a video, an audio file, a diagram, a geographical map, a medical image, a medical data file, a portable document format file, and any other specialised file type. It will be understood that this is a non-exhaustive and non-limiting list of example data item types. The sample data items may be selected to reflect typical data items generated within the environment.

The method may further comprise: prior to the generating, dividing the sample data item into two or more segments; and generating the at least one embedding vector for each of the two or more segments. That is, in cases where the sample data item is large, a single embedding vector generated for the sample data item may not be very representative of all the content and semantic meaning within the sample data item. Thus, it may be useful to divide the sample data item into smaller chunks or segments, such that the generated embedding vectors capture the semantic meaning of the segments. For example, an image may be divided into image patches or segments, a video may be divided into segments containing one or more frames, and an audio file may be divided into smaller audio segments. The segments may be overlapping. It will be understood that any suitable way of dividing the sample data item may be used.

In some cases, the step of generating at least one embedding vector may comprise: extracting text content from the sample data item; and generating at least one embedding vector for the extracted text content. Thus, the embedding vector(s) may be generated based on textual information within the sample data item. If the sample data item is, for example, an image or video, text may be extracted from the image or frames of the video. Additionally or alternatively, for videos or audio files, a transcript of any speech contained within the video/audio file may be extracted.

In cases where text content is extracted from the sample data item, the method may further comprise: prior to the generating, translating the extracted text into a pre-defined natural language. A natural language is any language used by humans, as opposed to, for example, computer programming languages. The pre-defined natural language may be a human language that is selected or determined in advance, and may be linked to the language used to train the embedding model. The translation may be required because the embedding model may have been trained using data items in one or more specific natural languages, such as English. The embedding model may not be able to process text in other languages, and therefore, the translation enables the embedding model to generate embedding vectors for data items that may contain other natural languages. Any suitable technique may be used to perform the translation. For example, the translation may be performed using machine translation techniques, which may utilise a large language model or other natural language processing mechanism.

The method may further comprise: prior to the generating, dividing the extracted text content into two or more segments; and generating the at least one embedding vector for each of the two or more segments. That is, in cases where the extracted text is long, a single embedding vector generated for the extracted text may not be very representative of all the content and semantic meaning within the text. Thus, it may be useful to divide the extracted text into smaller chunks or segments, such that the generated embedding vectors capture the semantic meaning of the segments. The extracted text may be divided into pages, paragraphs, or into segments of a certain number of words. It will be understood that any suitable way of dividing the text may be used.

In some cases, generating at least one embedding vector comprises: generating text content for the sample data item; and generating at least one embedding vector for the generated text content. This may be useful for sample data items that do not contain any text that can be extracted. The generated text content may be a description or summary of the non-text content of the sample data item. For example, if the sample data item is an image (e.g. photograph, frame of a video, medical image, graph, schematic diagram, flow-chart, diagram, etc.), the generated text content may summarise the meaning and content of the image. A large language model may be used to generate the text content, for example.

Additionally or alternatively, for sample data items that do not contain any text that can be extracted, the at least one embedding vector may be generated for the non-text content of the sample data item. That is, the embedding model may be a multi-modal embedding model able to process multiple types of input data, and generate an embedding vector representing some or all of the content of the data item. For example, the embedding model may be able to generate an embedding vector representing features of an image or audio file. Alternatively, different single-modality embedding models may be used to process different types of input data. For example, one embedding model may be used to process text, another to process images or video frames, another to process audio, and so on.

In some cases, the step of obtaining a plurality of classification labels to be used when labelling data items may comprise obtaining the labels from a human administrator of the method and system. For example, an administrator may specify the classification labels to be used for that specific environment.

Alternatively, the step of obtaining a plurality of classification labels to be used when labelling data items may comprise: inputting the plurality of sample data items into a large language model, LLM; outputting, from the large language model, a list of topics describing what the sample data items relate to; and obtaining the plurality of classification labels from the list of topics. Advantageously, this enables the labels to be automatically generated for the environment, which removes the need for manual input by a human administrator.

In this case, when inputting the plurality of sample data items into the LLM, a maximum number of topics to be output may also be input. That is, the LLM may be prompted to output a maximum number of topics, e.g. ten, to avoid too many labels being generated. This may be useful when there are only a limited number of data management policies to be applied, and so having a large list of specific labels may not be needed. The maximum number of topics may be defined by a human administrator of the system to suit the environment, or may be fixed for all environments.

In a fourth approach of the present techniques, there is provided a system for creating a classification database for determining a data management policy for a data item, the system comprising: a classification engine for obtaining: a plurality of classification labels to be used when labelling data items, and a plurality of sample data items representative of the plurality of classification labels; and an embedding machine learning, ML, model, for generating at least one embedding vector for each sample data item, where the at least one embedding vector captures characteristics of content of the sample data item; wherein the classification engine is configured for: associating the at least one embedding vector for each sample data item with one of the plurality of classification labels; and storing, in a database, the generated at least one embedding vector and associated classification label for each sample data item.

The features described above with respect to the third approach apply equally to the fourth approach and therefore, for the sake of conciseness, are not repeated.

In a fifth approach of the present techniques, there is provided a computer-implemented method for controlling actions performed with respect to a data item, the method comprising: identifying a non-labelled data item, within an environment in which actions performed with respect to the data item are being controlled; generating, using an embedding machine learning, ML, model, at least one embedding vector for the non-labelled data item, where the at least one embedding vector represents content of the non-labelled data item; comparing the generated at least one embedding vector to a database of stored embedding vectors that correspond to classification labels for data items; selecting, responsive to the comparing, at least one stored embedding vector that is most similar to the generated at least one embedding vector; applying, to the non-labelled data item, at least one classification label corresponding to the selected at least one stored embedding vector, and thereby generating a labelled data item; retrieving at least one data management policy corresponding to the at least one classification label of the labelled data item; and using the at least one data management policy to control an action performed with respect to the labelled data item.

Advantageously, the present techniques enable actions to be automatically and immediately applied to, or with respect to, a new non-labelled data item, once it has been labelled and at least one appropriate data management policy has been identified.

The features described above with respect to the first approach apply equally to the fifth approach and therefore, for the sake of conciseness, are not repeated.

The applying step may comprise applying multiple classification labels to the non-labelled data item, for the same reasons as those described above. In this case, retrieving at least one data management policy for the labelled data item may comprise: retrieving a data management policy corresponding to each classification label of the multiple classification labels applied to the non-labelled data item; and determining which data management policy or policies to use to control actions performed with respect to the labelled data item.

In some cases, where the retrieved policies do not conflict or contradict with each other, the determining may comprise determining that all of the retrieved policies can be used. For example, one of the retrieved policies may relate to data retention and one may relate to access, and both of these policies can be applied. In cases where the retrieved policies conflict or contradict each other, determining which data management policy or policies to use to control actions performed with respect to the labelled data item may comprise: selecting the most strict data management policy from the data management policies corresponding to the multiple labels. The strictness of a policy may depend on what the policy relates to. For example, if a policy allows access for one classification, but denies another, then "deny" could be the resultant action. For data retention, if one classification requires data to be kept for 1 year, and another classification for 2 years, the longest retention period will be chosen. If one classification allows access without producing an audit record and another allows access but requires audit record, then an audit record should be produced.

The method may further comprise: receiving an override instruction to ignore one or more of: a label applied to the labelled data item, and a data management policy associated with a label applied to the labelled data item. Thus, an administrator of the system may be able to override a data management policy associated with a labelled data item.

Using the at least one data management policy to control an action performed with respect to the labelled data item may comprise: receiving a request to perform an action with respect to the labelled data item; determining, using the at least one data management policy, whether the request should be granted; and granting the request to perform the action with respect to the labelled data item responsive to the determining. For example, a user of the system may attempt to delete a labelled data item. The data management policy (ies) associated with the labelled data item may determine whether the labelled data item can be deleted. For example, a data management policy may specify that the labelled data item has to be retained within the system for a period of five years. If the labelled data item has existed in the system for less than five years, the request to delete the labelled data item will not be granted in view of the data management policy. In another example, a user of the system may attempt to read a labelled data item which is associated with a data management policy that restricts access to specific users. The user's request may only be granted if they are listed as a user that is permitted access.

Using the at least one data management policy to control an action performed with respect to the labelled data item may comprise controlling any one or more of: accessing, reading, modifying, editing, sharing, archiving, deleting, distributing within the environment, and distributing external to the environment. It will be understood that this is a non-exhaustive list of example actions that could be performed with respect to a labelled data item. The action may be performed by a separate access management system.

In a sixth approach of the present techniques, there is provided a system for controlling actions performed with respect to a data item in an environment, the system comprising: a classification database (the creation of which is described above) for storing embedding vectors that correspond to classification labels for data items; a classification engine (which may be a software-based engine) for identifying a non-labelled data item within the system; and an embedding machine learning, ML, model for generating at least one embedding vector for the non-labelled data item, where the at least one embedding vector represents content of the non-labelled data item; wherein the classification engine is configured for: comparing the generated at least one embedding vector to the database of stored embedding vectors; selecting, responsive to the comparing, at least one stored embedding vector that is most similar to the generated at least one embedding vector; applying, to the non-labelled data item, at least one classification label corresponding to the selected at least one stored embedding vector, and thereby generating a labelled data item; retrieving at least one data management policy corresponding to at least one classification label of the labelled data item; and using the at least one data management policy to control an action performed with respect to the labelled data item.

The features described above with respect to the first approach and fifth approach apply equally to the sixth approach and therefore, for the sake of conciseness, are not repeated.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

BRIEF DESCRIPTION OF THE DRAWINGS

Implementations of the present techniques will now be described, by way of example only, with reference to the accompanying drawings, in which:

FIG. 2 is a flowchart of example steps for determining a data management policy for a data item;

FIG. 4 is a flowchart of example steps for controlling actions performed with respect to a data item.

DETAILED DESCRIPTION OF THE DRAWINGS

Broadly speaking, the present techniques provide an automatic way of classifying data items within an environment (e.g. a business, workplace, organisation, etc.), and applying data management policies based on the classifications. This is advantageous over existing techniques which require manual classification of data items, which is time consuming in environments where hundreds of new data items may be generated in a day or week. The present techniques use an embedding machine learning, ML, model to automatically determine the relevant classification label(s) for an unlabelled data item, which is then used to select and apply the relevant data management policy(ies).

Figure 1:
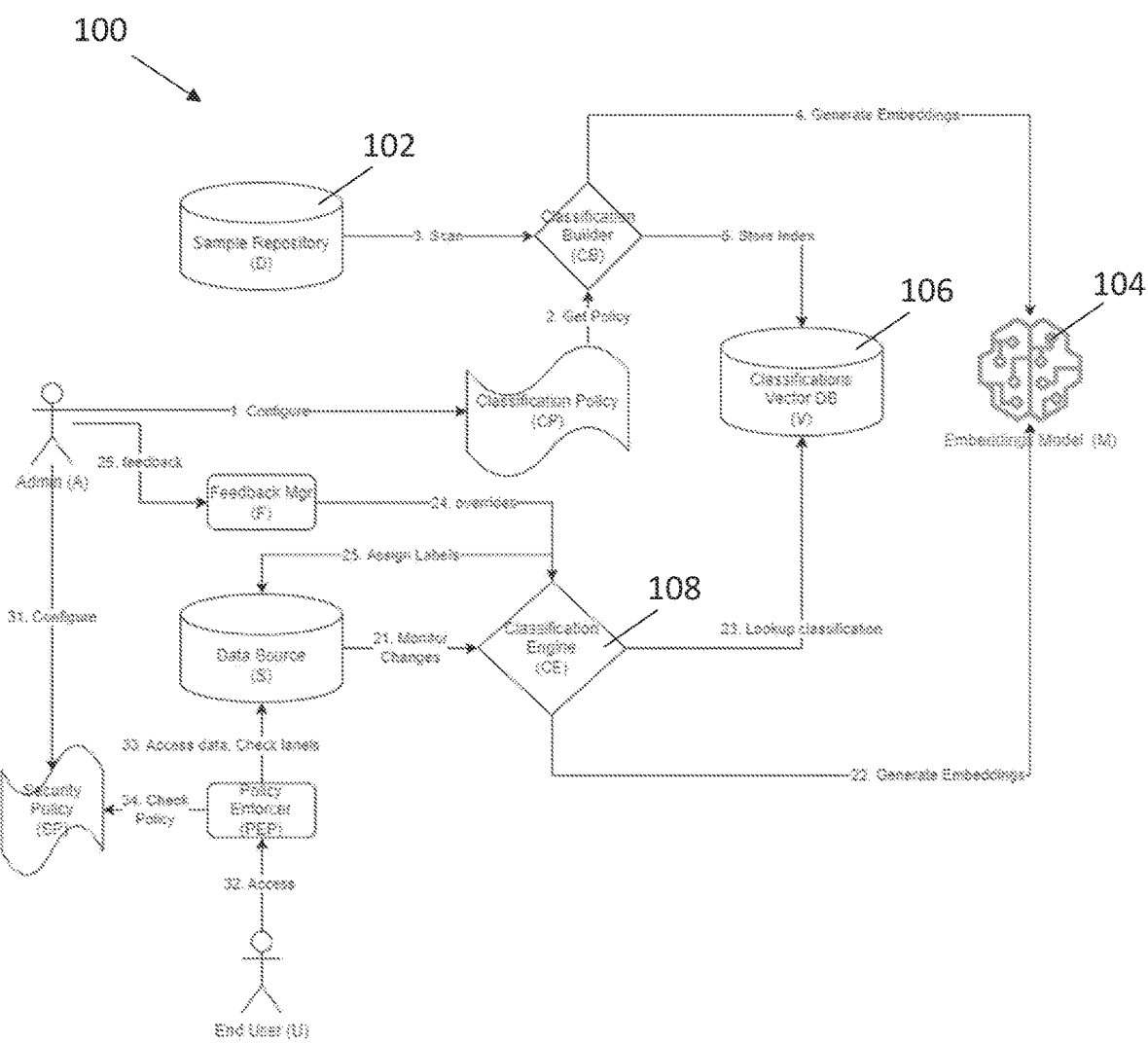
FIG. 1 is a schematic diagram of a system for determining a data management policy for a data item.

FIG. 1 is a schematic diagram of a system 100 for building a classification database, and for determining a data management policy for a data item using the classification database.

Generally speaking, an administrator A of the system 100 provides a sample repositories of documents D, that are each labelled with at least one classification label. The system 100 indexes these documents using a classification builder CB. The system also uses an embeddings model 104 to generate embeddings—these are stored in a vector database 106, which is the classification database. It will be understood that although a single embedding model 104 is shown in FIG. 1, the system 100 may comprise a single single-modality embedding model (i.e. a model that can process a single type or modality of data), a single multiple-modality embedding model (i.e. a model that can process multiples types or modalities of data), or multiple single-modality embedding models that are each able to process a specific type or modality of data.

Once the classification database 106 has been built, the system 100 continuously scans, using a classification engine 108, data sources S that are monitored by the system 100, in order to identify new data items that have not yet been labelled with classification labels. Some or all data sources S within a system may be monitored by system 100. For example, the data sources S may include some or all user U computers within the system 100, because users are generating files, sending and receiving emails, and so on.

The system 100 may generate at least one embedding vector for each new unlabelled data item that has been identified. To determine which classification label(s) should be applied to the new unlabelled data item, the system 100 compares the generated embedding vectors which those saved within classification database 106. The most similar stored embedding vector(s) in classification database 106 to the generated embedding vector(s) is then used to determine the label(s) to be applied to the unlabelled data item. The system can then enforce document data management policies (PEP) using the classification label(s), where the data management policies may include, among other things, access policies, distribution policies and data retention policies. Users U may also be able to provide feedback F to the system 100, which could be used to override automated classification.

The system shown in FIG. 1 is now described in more detail. The system may be used for three different, but related, tasks.

Task 1—Classification index generation & policy definition: An administrator A may obtain a set of classification policies CP for an environment in which system 100 is running. The set of classification policies CP may comprise one or more classification policies. The set of classification policies may specify how data items within the system are to be classified. The set of classification policies may include a list of classification labels to be applied to data items within the system. Defining a set of classification policies may be done in advance by a software vendor or may be customized by each organization.

The administrator may also provide a repository D 102 (also referred to as a database herein) of sample data items, which are reflective of the types of data items that are commonly generated within system 100, and which are representative of different classes. For example, the sample data items may include contracts, salary statements, meeting minutes, financial information, business information, etc.

It may be useful to validate database 102 to check that the database contains a sufficiently large amount of sample data items that represent a large spectrum of data items that are generated within the environment in which system 100 runs. For example, if there are only five sample data items, there may not be enough sample data items to reflect all types of data items that could be generated. The database 102 may be checked to determine whether the sample data items are too uniform or similar. If there is not enough or any variation in the sample data items, the sample data items may not be truly reflective of the data items being generated within the environment. For example, if all of the sample data items relate to financial reports, then the sample data items will not be useful for classifying other types of content, such as personnel information, business confidential information, etc. Similarly, the database 102 may be checked to determine whether any of the sample data items are too different from the others. Outliers or sample data items that do not actually belong to this environment would not be useful for classifying data items in this environment, so this check can help to remove such documents that are too distinct or different from the rest. These checks may be performed by administrator A.

The administrator A then assigns each sample data item in the sample repository 102 at least one classification label. The classification label(s) may be stored in the set of classification policies CP.

In some cases, the step of obtaining a set of classification policies including a plurality of classification labels to be used when labelling data items, may comprise obtaining the labels from a human administrator A of the system 100. For example, administrator A may specify the classification labels to be used for that specific environment.

Alternatively, the step of obtaining a plurality of classification labels to be used when labelling data items may comprise: inputting the plurality of sample data items in the database 102 into a large language model, LLM (not shown); outputting, from the large language model, a list of topics describing what the sample data items relate to; and obtaining the plurality of classification labels from the list of topics. Advantageously, this enables the labels to be automatically generated for the environment, which removes the need for manual input by a human administrator.

In this case, when inputting the plurality of sample data items into the LLM, a maximum number of topics to be output may also be input. That is, the LLM may be prompted to output a maximum number of topics, e.g. ten, to avoid too many labels being generated. This may be useful when there are only a limited number of policies to be applied, and so having a large list of specific labels may not be needed.

As shown below with reference to FIG. 5, the present techniques include a method to identify organisational topics and their frequency in the sample data set D. The method involves inputting into a large language model (LLM) similar to but not limited to, for example, GPT-4, some or all of the sample data items in the repository 102. In some cases, a textual description of the document types (e.g., emails, product reviews, twitter posts), may also be input into the LLM at the same time. The LLM may be prompted to output: the top n (parameter) recurring topics; and for each document, the associated subtopics (from the top n topics). The value of n is any integer value, which may be set by a human administrator of the system.

More specifically, the data items from the repository 102 are fed into the LLM in batches, where the size of the batches may be based on the amount of data that the LLM can process in one run. The data items may be input together with any additional textual description of the data items. The textual description may be for the whole batch, or for each data item in the batch. The textual description(s) may be generated by a human or by an LLM or other machine learning model capable of generating summaries of content in an input data item. The LLM is then prompted to generate topics based on the input data items and optional textual description(s). The LLM may be prompted to only generate a specific number of topics.

An initial set of topics generated by the LLM may be input back into the LLM with a prompt to generate a refined list of mutually exclusive topics that cover the initially derived topics. The prompt may include a maximum number of mutually exclusive topics to be generated. The LLM then outputs a list of n mutually exclusive topics.

This method for generating topics automatically is useful in environments containing a vast volume of data items. The volume of data items means manually sorting through the data items to identify relevant topics that could be used to classify data items is a daunting and time-consuming task. Advantageously, the present method automates this topic identification process. By applying the present LLM-based topic analysis algorithm to a repository 102 of data items, it is possible to efficiently and cost-effectively identify the recurring topics across all data items. The output topics also provide insights into the primary topics present in the volume of data items in an environment, without the need for additional human labour. This approach helps streamline document management processes, improves data analytics capabilities, and potentially uncovers critical insights that could drive data security measures within the environment.

Once the classification policy and classification labels have been obtained/defined, the sample data items in the database 102 are analysed. A classification builder CB may analyse the sample data items in the database 102. The classification builder may extract text from each sample data item. Each sample data item may be any one or more of: an email, a document, a file, a text file, a folder, an image, a video, an audio file, and a portable document format file. It will be understood that this is a non-exhaustive and non-limiting list of example data item types. The sample data items may be selected to reflect typical data items generated within the environment. If the sample data item is an image or video, text may be extracted from the image or frames of the video. Additionally or alternatively, for videos or audio files, a transcript of any speech contained within the video/audio file may be extracted.

In some cases, the classification builder CB may translate text extracted from each sample data item into a pre-defined natural language. A natural language is any language used by humans, as opposed to, for example, computer programming languages. The translation may be required because the embedding model 104 may have been trained using data items in one or more specific natural languages, such as English. Any suitable technique may be used to perform the translation. For example, the translation may be performed using machine translation techniques, which may utilise a large language model or other natural language processing mechanism (not shown).

The embedding model 104 generates at least one embedding vector for each sample data item, where the at least one embedding vector captures characteristics of content of the sample data item. The generated at least one embedding vector for each sample data item is associated with one of the plurality of classification labels from the classification policy CP. The generated at least one embedding vector and associated classification label for each sample data item is then stored in database 106. Each embedding vector may be considered an index, and the associated classification label may be considered a value.

In cases where the extracted text is too long, the extracted text may be split into overlapping chunks or segments, and each chunk/segment may be indexed separately. For example, the extracted text may be broken into pages (or paragraphs) 1-3, 4-6, and then another breakage (2-5, 5-7), where each page is indexed separately. In other words, prior to generating embedding vectors, the extracted text may be divided into two or more segments. Then the generating step may comprise generating at least one embedding vector for each of the two or more segments. That is, in cases where the extracted text is long, a single embedding vector generated for the extracted text may not be very representative of all the content and semantic meaning within the text. Thus, it may be useful to divide the extracted text into smaller chunks or segments, such that the generated embedding vectors capture the semantic meaning of the segments. The extracted text may be divided into pages, paragraphs, or into segments of a certain number of words. It will be understood that any suitable way of dividing the text may be used.

It will be understood that new sample data items may be added to database 102 periodically. For example, if the system is only initially used to classify data items generated within a finance department of an organisation, the sample data items in the database 102 may all be finance-related. However, when the system is expanded to classify data items generated within finance, human resources and legal departments of the organisation, the database 102 needs to be updated with relevant sample data items. Thus, the database 102 may be periodically scanned or whenever the contents have changed, and the steps to generate embedding vectors for the sample data items repeated for all new sample data items in the database 102.

Task 2—identifying and classifying unlabelled data items: The system 100 continuously scans one or more data sources S within the system to identify any new non-labelled data items within the system. When a new non-labelled data items is identified, or whenever a modification made to an existing labelled data item is identified, the system generates, using the embedding machine learning, ML, model 104, at least one embedding vector for the non-labelled data item (or modified labelled data item), where the at least one embedding vector captures characteristics of content of the identified data item.

The system then: compares the generated at least one embedding vector to the database 106 of stored embedding vectors that correspond to classification labels for data items; selects, responsive to the comparing, at least one stored embedding vector that is most similar to the generated at least one embedding vector; applies, to the identified data item, at least one classification label corresponding to the selected at least one stored embedding vector, and thereby generates a labelled data item (or modified labelled data item); and retrieves, from storage PEP storing a plurality of data management policies for each classification label, at least one data management policy for the at least one classification label of the labelled data item.

The step of generating at least one embedding vector may comprise: extracting text from the identified data item; and generating at least one embedding vector for the extracted text. Thus, the embedding vector(s) may be generated based on textual information within the data item. If the non-labelled data item is an image or video, text may be extracted from the image or frames of the video. Additionally or alternatively, for videos or audio files, a transcript of any speech contained within the video/audio file may be extracted.

In cases where text is extracted from the non-labelled data item, the method may further comprise: prior to the generating, translating the extracted text into a pre-defined natural language. A natural language is any language used by humans, as opposed to, for example, computer programming languages. The translation may be required because the embedding model may have been trained using data items in one or more specific natural languages, such as English. The embedding model may not be able to process text in other languages, and therefore, the translation enables the embedding model to generate embedding vectors for data items that may contain other natural languages. Any suitable technique may be used to perform the translation. For example, the translation may be performed using machine translation techniques, which may utilise a large language model or other natural language processing mechanism.

The method may further comprise: prior to the generating, dividing the extracted text into two or more segments; and generating the at least one embedding vector for each of the two or more segments. That is, in cases where the extracted text is long, a single embedding vector generated for the extracted text may not be very representative of all the content and semantic meaning within the text. Thus, it may be useful to divide the extracted text into smaller chunks or segments, such that the generated embedding vectors capture the semantic meaning of the segments. The extracted text may be divided into pages, paragraphs, or into segments of a certain number of words. It will be understood that any suitable way of dividing the text may be used.

Comparing the generated at least one embedding vector to a database of stored embedding vectors may comprise: calculating a cosine similarity between the generated at least one embedding vector and each stored embedding vector. Cosine similarity is a measure of the similarity between two vectors, and is calculated by determining the cosine of the angle $\theta$ between the two vectors. When $\theta$ is close to 0°, cosine $\theta$ is close to 1, which means the vectors are similar; when $\theta$ is close to 90°, cosine $\theta$ is close to 0, which means the vectors are orthogonal; and when $\theta$ is close to 180°, cosine $\theta$ is close to $-1$ which means the vectors are opposite.

Selecting at least one stored embedding vector that is most similar to the generated at least one embedding vector may comprise: selecting at least one stored embedding vector that is within a predefined threshold distance in embedding space from the generated at least one embedding vector. For example, the cosine similarity may be used to determine which stored embedding vector is most similar to each embedding vector. Additionally or alternatively, each stored embedding vector within a predefined threshold distance (e.g. having a cosine θ value in a certain range), may be considered similar to the generated embedding vector.

In some cases, applying, to the non-labelled data item, the classification label corresponding to the selected at least one stored embedding vector may comprise: applying a single classification label to the non-labelled data item. That is, each non-labelled data item is labelled within a single classification label that is most representative of the data item or information contained within the data item.

Alternatively, applying, to the non-labelled data item, the classification label corresponding to the selected at least one stored embedding vector may comprise: applying multiple classification labels to the non-labelled data item. In such cases, multiple classification labels may be necessary to fully represent the data item or information contained within the data item. This may occur in cases where the extracted text has been divided into segments and each segment results in a different classification label being applied. Alternatively, this may occur when the data item corresponds to multiple labels. For example, the data item may be an email, and "email" may be a label, but the content of the email may be confidential, and "confidential" may be a label. In this case, it is appropriate to apply two labels to the data item.

In cases where a labelled data item has multiple labels, retrieving at least one data management policy for the labelled data item may comprise: retrieving a data management policy corresponding to each label of the multiple classification labels applied to the non-labelled data item; and determining which data management policy or policies to apply to the labelled data item. Continuing with the above example, for a data item that is labelled with "email" and "confidential", two data management policies may be retrieved-one for "email", and one for "confidential". The "email" data management policy may relate to data retention, i.e. how long the email needs to be retained within the environment. The "confidential" data management policy may dictate who within the environment is able to access, read and/or edit the data item, and who is prevented from doing so. In this case, both policies may be applied to the data item without any conflict. However, in cases where the policies conflict or contradict with each other, it may be necessary to determine which policy to use, or how to use all of the retrieved policies. In some cases, the strictest policy of the retrieved policies may be applied.

The at least one label applied to the identified data item (non-labelled data item or modified labelled data item), may be stored in an external database, in the data item itself as a metadata, or added as an encrypted/signed property to the data item to prevent the label being modified by anyone.

Task 3—Controlling actions performed with respect to a labelled data item: the system 100 may be used to control actions that can be performed to, or with respect to, labelled data items within the environment. The controlling may comprise controlling any one or more of: accessing, reading, modifying, editing, sharing, archiving, deleting, distributing within the environment, and distributing external to the environment. It will be understood that this is a non-exhaustive list of example actions that could be performed with respect to a labelled data item.

The administrator A may create a data management policy SP for each classification label, specifying what can be done with a data item with such label, e.g. who can access it, where it can be stored or sent, how long should it be stored, etc.

When a data item with a classification label is attempted to be accessed or processed by a user U, the system 100 may check whether the accessing or processing is permitted by the data management policy associated with the classification label of the data item. Thus, using the at least one data management policy to control an action performed with respect to the labelled data item may comprise: receiving a request to perform an action with respect to the labelled data item; determining, using the at least one data management policy, whether the request should be granted; and controlling the action performed relative to the labelled data item responsive to the determining. For example, a user of the system may attempt to delete a labelled data item. The data management policy (ies) associated with the labelled data item may determine whether the labelled data item can be deleted. For example, a data management policy may specify that the labelled data item has to be retained within the system for a period of five years. If the labelled data item has existed in the system for less than five years, the request to delete the labelled data item will not be granted in view of the data management policy. In another example, a user of the system may attempt to read a labelled data item which is associated with a data management policy that restricts access to specific users. The user's request may only be granted if they are listed as a user that is permitted access.

The method may further comprise: receiving an override instruction to ignore one or more of: a label applied to the labelled data item, and a data management policy associated with a label applied to the labelled data item. Thus, an administrator A or user U of the system may be able to override a data management policy associated with a labelled data item. Users can provide feedback, to indicate that a particular data item was misclassified, which is then reviewed by administrator A. If the administrator A confirms the misclassification, the administrator A may store an override rather than altering the incorrect classification label, or may specify that different thresholds need to be used for this data item when performing the step of identifying a similar embedding vector in the database 106. The system (e.g. the classification engine 108) may also be able to indicate which sample data item from the sample repository 102 was considered to bet most similar to the misclassified data item, which thereby allows the administrator to modify the sample repository 102 by removing the sample data item that led to the misclassification and/or by adding additional sample data items to help improve classification in the future.

FIG. 2 is a flowchart of example steps for determining a data management policy for a data item, which corresponds to task 2 described above. The method comprises: identifying a non-labelled data item within an environment having at least one data management policy (step S100); generating, using an embedding machine learning, ML, model, at least one embedding vector for the non-labelled data item, where the at least one embedding vector captures characteristics of content of the non-labelled data item (step S102); comparing the generated at least one embedding vector to a database of stored embedding vectors that correspond to classification labels for data items (step S104); selecting, responsive to the comparing, at least one stored embedding vector that is most similar to the generated at least one embedding vector (step S106); applying, to the non-labelled data item, at least one classification label corresponding to the selected at least one stored embedding vector, and thereby generating a labelled data item (step S108); and retrieving, from storage storing a plurality of data management policies for each classification label, at least one data management policy for the at least one classification label of the labelled data item (step S110).

Figure 3:
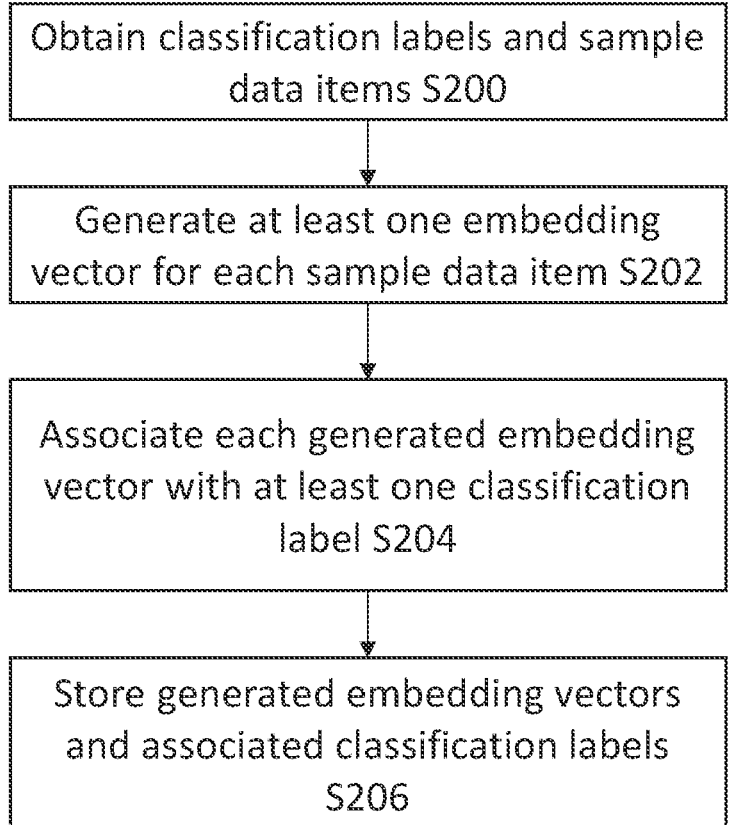
FIG. 3 is a flowchart of example steps for creating a classification database for use when determining a data management policy for a data item.

FIG. 3 is a flowchart of example steps for creating a classification database for use when determining a data management policy for a data item, which corresponds to task 1 described above. The method comprises: obtaining: a plurality of classification labels to be used when labelling data items, and a plurality of sample data items representative of the plurality of classification labels (step S200); generating, using an embedding machine learning, ML, model, at least one embedding vector for each sample data item, where the at least one embedding vector captures characteristics of content of the sample data item (step S202); associating the at least one embedding vector for each sample data item with one of the plurality of classification labels (step S204); and storing, in a database, the generated at least one embedding vector and associated classification label for each sample data item (step S204).

FIG. 4 is a flowchart of example steps for controlling actions performed with respect to a data item, which corresponds to task 3 described above. The method comprises: identifying a non-labelled data item, within an environment in which actions performed with respect to the data item are being controlled (step S300); generating, using an embedding machine learning, ML, model, at least one embedding vector for the non-labelled data item, where the at least one embedding vector captures characteristics of content of the non-labelled data item (step S302); comparing the generated at least one embedding vector to a database of stored embedding vectors that correspond to classification labels for data items (step S304); selecting, responsive to the comparing, at least one stored embedding vector that is most similar to the generated at least one embedding vector (step S306); applying, to the non-labelled data item, at least one classification label corresponding to the selected at least one stored embedding vector, and thereby generating a labelled data item (step S308); retrieving, from storage storing a plurality of data management policies for each classification label, at least one data management policy for the at least one classification label of the labelled data item (step S310); and using the at least one data management policy to control an action performed with respect to the labelled data item (step S312).

Figure 5:
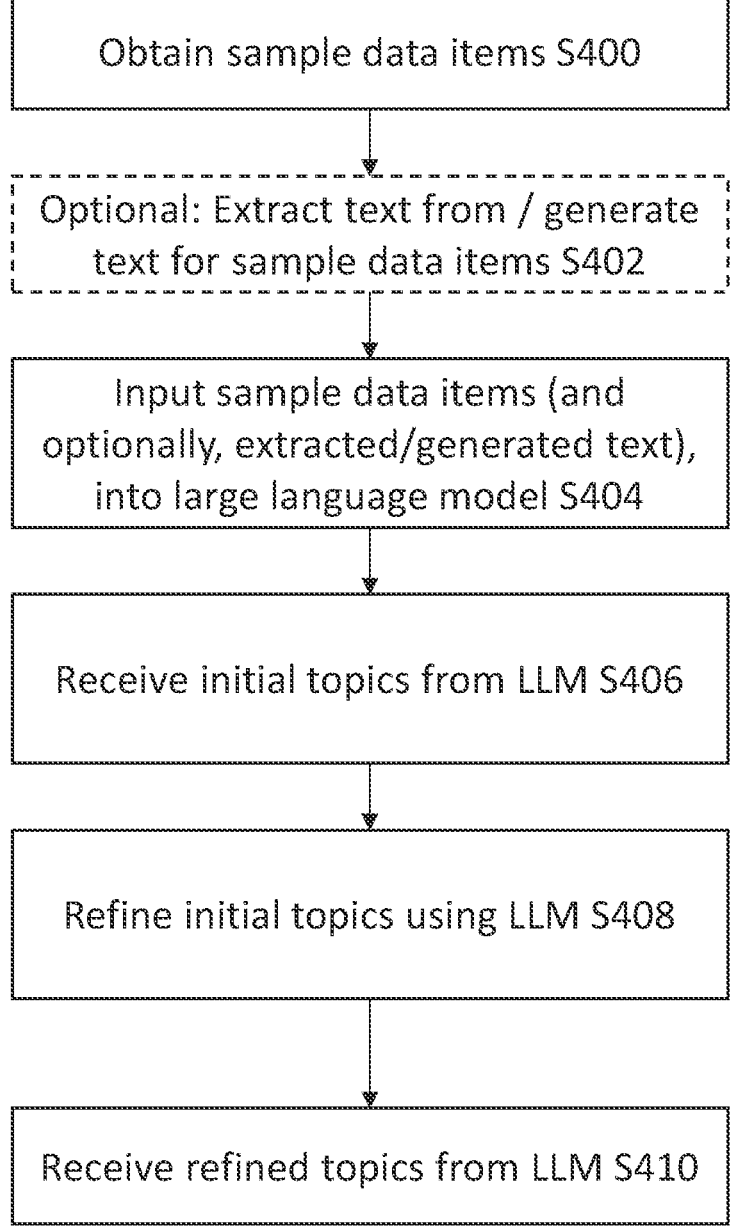
FIG. 5 is a flowchart example steps for obtaining a plurality of classification labels to be used when labelling data items.

FIG. 5 is a flowchart example steps for obtaining a plurality of classification labels to be used when labelling data items. This process may lead from step S200 of FIG. 3, which is the process to create a classification database. Step S200 involves obtaining classification labels and sample data items. FIG. 5 describes one process for obtaining those classification labels for the obtained sample data items.

Thus, the process begins by obtaining a set of sample data items (step S400). The sample data items from the repository 102 are fed into a LLM in batches (step S404), where the size of the batches may be based on the amount of data that the LLM can process in one run.

Optionally, the sample data items may be input together with any additional textual description of the data items (step S404). The textual description may be for the whole batch, or for each data item in the batch. The textual description(s) may be generated by a human or by an LLM or other machine learning model capable of generating summaries of content in an input data item. Thus, optionally, the method may comprise extracting text from or generating text for sample data items (step S402).

The LLM is then prompted to generate topics based on the input data items and optional textual description(s) (step S404). The LLM may be promoted to only generate a specific number of topics.

An initial set of topics generated by the LLM (step S406) may be input back into the LLM with a prompt to generate a refined list of mutually exclusive topics that cover the initially derived topics (step S408). The prompt may include a maximum number of mutually exclusive topics to be generated. The LLM then outputs a list of n mutually exclusive topics (step S410).

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for controlling actions performed with respect to a data item using a data management policy, the method comprising:

identifying a non-labelled data item within an environment in which actions performed with respect to the data item are being controlled;

generating, using an embedding machine learning (ML) model, at least one embedding vector for the non-labelled data item, where the at least one embedding vector captures characteristics of content of the non-labelled data item;

comparing the generated at least one embedding vector to a database of stored embedding vectors that correspond to classification labels for data items;

selecting, responsive to the comparing, at least one stored embedding vector that is most similar to the generated at least one embedding vector;

applying, to the non-labelled data item, at least one classification label corresponding to the selected at least one stored embedding vector, and thereby generating a labelled data item;

retrieving at least one data management policy corresponding to the at least one classification label of applied to the labelled data item; and using the at least one retrieved data management policy to control an action performed with respect to the labelled data item.

2. The method as claimed in claim 1 further comprising:

prior to the generating, dividing the non-labelled data item into two or more segments; and generating the at least one embedding vector for each of the two or more segments.

3. The method as claimed in claim 1 wherein generating at least one embedding vector comprises:

extracting text content from the non-labelled data item; and generating at least one embedding vector for the extracted text content.

4. The method as claimed in claim 3 further comprising:

prior to the generating, translating the extracted text content into a pre-defined natural language.

5. The method as claimed in claim 3 further comprising:

prior to the generating, dividing the extracted text content into two or more segments; and generating the at least one embedding vector for each of the two or more segments.

6. The method as claimed in claim 1 wherein comparing the generated at least one embedding vector to a database of stored embedding vectors comprises:

calculating a cosine similarity between the generated at least one embedding vector and each stored embedding vector.

7. The method as claimed in claim 1 wherein selecting at least one stored embedding vector that is most similar to the generated at least one embedding vector comprises:

selecting at least one stored embedding vector that is within a predefined threshold distance in embedding space from the generated at least one embedding vector.

8. The method as claimed in claim 1 wherein applying, to the non-labelled data item, the classification label corresponding to the selected at least one stored embedding vector comprises:

applying a single classification label to the non-labelled data item.

9. The method as claimed in claim 1 wherein applying, to the non-labelled data item, the classification label corresponding to the selected at least one stored embedding vector comprises:

applying multiple classification labels to the non-labelled data item when multiple stored embedding vectors are selected.

10. The method as claimed in claim 9 wherein retrieving at least one data management policy for the labelled data item comprises:

retrieving a data management policy corresponding to each label of the multiple classification labels applied to the non-labelled data item; and determining which data management policy or policies to use to control actions performed with respect to the labelled data item.

11. The method as claimed in claim 1 wherein the applying comprises applying multiple classification labels to the non-labelled data item, and wherein retrieving at least one data management policy for the labelled data item comprises:

retrieving a security policy corresponding to each classification label of the multiple classification labels applied to the non-labelled data item; and determining which data management policy or policies to use to control actions performed with respect to the labelled data item.

12. The method as claimed in claim 11 wherein determining which data management policy or policies to use to control actions performed with respect to the labelled data item comprises:

selecting the most strict security policy from the data management policies corresponding to the multiple labels.

13. The method as claimed in claim 1 further comprising:

receiving an override instruction to ignore one or more of: a label applied to the labelled data item, and a data management policy associated with a label applied to the labelled data item.

14. The method as claimed in claim 1 wherein using the at least one data management policy to control an action performed with respect to the labelled data item comprises:

receiving a request to perform an action with respect to the labelled data item;

determining, using the at least one data management policy, whether the request should be granted; and granting the request to perform the action with respect to the labelled data item responsive to the determining.

15. The method as claimed in claim 1 wherein using the at least one data management policy to control an action performed with respect to the labelled data item comprises controlling any one or more of: accessing, reading, modifying, editing, sharing, archiving, deleting, distributing within the environment, and distributing external to the environment.

16. A system for controlling actions performed with respect to a data item in an environment, the system comprising:

a classification database for storing embedding vectors that correspond to classification labels for data items;

a classification engine for identifying a non-labelled data item within the system; and an embedding machine learning, ML, model for generating at least one embedding vector for the non-labelled data item, where the at least one embedding vector represents content of the non-labelled data item;

wherein the classification engine is configured for:

comparing the generated at least one embedding vector to the database of stored embedding vectors;

selecting, responsive to the comparing, at least one stored embedding vector that is most similar to the generated at least one embedding vector;

applying, to the non-labelled data item, at least one classification label corresponding to the selected at least one stored embedding vector, and thereby generating a labelled data item;

retrieving, from storage storing a plurality of data management policies for each classification label, at least one data management policy corresponding to the at least one classification label of the labelled data item; and using the at least one data management policy to control an action performed with respect to the labelled data item.

* * * * *